(12) United States Patent
Jiang

(10) Patent No.: US 11,323,977 B2
(45) Date of Patent: May 3, 2022

(54) METHOD, APPARATUS, USER EQUIPMENT AND BASE STATION FOR IMPLEMENTING LOCATION AREA UPDATE

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Software co., Ltd., Beijing (CN)

(*) Notice: Subject to any disclaimer, the term of this patent is extended or adjusted under 35 U.S.C. 154(b) by 116 days.

(21) Appl. No.: 16/649,612

(22) PCT Filed: Sep. 22, 2017

(86) PCT No.: PCT/CN2017/102970
§ 371 (c)(1),
(2) Date: Mar. 20, 2020

(87) PCT Pub. No.: WO2019/056308
PCT Pub. Date: Mar. 28, 2019

(65) Prior Publication Data
US 2020/0288425 A1 Sep. 10, 2020

(51) Int. Cl.
*H04W 4/00* (2018.01)
*H04W 60/04* (2009.01)
(Continued)

(52) U.S. Cl.
CPC .......... *H04W 60/04* (2013.01); *H04W 4/90* (2018.02); *H04W 36/32* (2013.01); *H04W 76/19* (2018.02); *H04W 76/27* (2018.02)

(58) Field of Classification Search
CPC ....... H04W 60/04; H04W 76/19; H04W 4/90; H04W 76/27; H04W 36/32
(Continued)

(56) References Cited

U.S. PATENT DOCUMENTS 10,129,802 B2 * 11/2018 Pelletier ................ H04L 5/0048
10,356,837 B2 * 7/2019 Chen ..................... H04W 76/27
(Continued)

FOREIGN PATENT DOCUMENTS

| CN | 102340886 A | 2/2012 |
|---|---|---|
| CN | 102638880 A | 8/2012 |

(Continued)

OTHER PUBLICATIONS

Second office action of Chinese application No. 201780001443.4 dated Aug. 11, 2021.
(Continued)

*Primary Examiner* — Amancio Gonzalez
(74) *Attorney, Agent, or Firm* — Arch & Lake LLP

(57) ABSTRACT

A method, an apparatus, a user equipment and a base station are provided for implementing location area update. In the method, the UE obtains a judgment result by determining whether there is data to be transmitted currently, when a radio access network-based location area update (RLAU) is triggered, where the data to be transmitted is one of service data and signaling data. The UE determines a second message based on the judgment result and a first message, where the first message is an original connection resume request message, and the second message carries a cause value requesting for resuming connection. The UE transmits the second message to the base station.

20 Claims, 10 Drawing Sheets

(51) Int. Cl.
*H04W 76/19* (2018.01)
*H04W 4/90* (2018.01)
*H04W 76/27* (2018.01)
*H04W 36/32* (2009.01)

(58) Field of Classification Search
USPC .......................................................... 370/329
See application file for complete search history.

(56) References Cited

U.S. PATENT DOCUMENTS

| | | | |
|---|---|---|---|
| 10,575,286 B2 | 2/2020 | Islam et al. | |
| 10,897,708 B2* | 1/2021 | Shih | H04W 60/00 |
| 10,917,786 B2* | 2/2021 | Ryoo | H04W 52/0229 |
| 11,184,938 B2* | 11/2021 | Lee | H04W 76/11 |
| 2007/0218881 A1* | 9/2007 | Voyer | H04W 60/04 |
| | | | 455/414.1 |
| 2018/0092157 A1* | 3/2018 | Chen | H04W 52/028 |
| 2019/0174571 A1* | 6/2019 | Deenoo | H04W 76/11 |

FOREIGN PATENT DOCUMENTS

| | | |
|---|---|---|
| CN | 106658758 A | 5/2017 |
| CN | 106793169 A | 5/2017 |
| CN | 106793170 A | 5/2017 |
| CN | 106879009 A | 6/2017 |

OTHER PUBLICATIONS

Lenovo, et al., 23.501: Update to RRC inactive state; SA WG2 Meeting # 122bis S2-175933, Aug. 15, 2017, pp. 2-3.
CATT, Trigger to resume NAS signalling in EMM procedures; 3GPP TSG-CT WG1 ad-hoc meeting on IoT C1A160040, Apr. 22, 2016, entire document.
International Search and English translation to PCT Application No. PCT/CN2017/102970, dated Jun. 7, 2018, (4p).
"UE-Initiated RAN-Based Notification Area Update Procedure" 3GPP TSG-RAN WG2 Meeting #99 R2-1707864, Aug. 11, 2017 (5p).
First Office Action of Chinese Application No. 201780001443.4 dated Jan. 27, 2021 with English translation, (21p).

* cited by examiner

METHOD, APPARATUS, USER EQUIPMENT AND BASE STATION FOR IMPLEMENTING LOCATION AREA UPDATE

CROSS-REFERENCE TO RELATED APPLICATION

This application is a national phase application based on PCT/CN2017/102970, filed on Sep. 22, 2017, the content of which is incorporated herein by reference.

TECHNICAL FIELD

The present disclosure relates to the field of communication technology, and more particularly to a method, an apparatus, a user equipment and a base station for implementing a location area update.

BACKGROUND

During the research and discussion of projects of the 5th Generation (5G) mobile communication technology, an inactive state of User Equipment (UE) is introduced. When UE is in an inactive state, it can maintain mobility through a cell selection/re-selection mechanism; and when the Radio Access Network based Notification Area (RNA) is updated, it may instruct to the radio access network side with an updated notification area.

In the related art, an update of an RNA can be realized based on the connection resume process in the research and discussion of 5G on the RNA, namely, when an update in the RNA, UE can transmit a connection resume requesting message to a base station, the resume requesting message carrying instruction information indicating a location update; after the base station replies to the resume message and the UE replies to the resume finished message (at this moment, the state of UE is resumed to a connection state), the base station then instructs the UE to switch to an inactive state via a connection release message to complete the RNA update operation.

SUMMARY

The present disclosure provide a method, an apparatus, a user equipment, and a base station for implementing a location area update.

According to a first aspect of the present disclosure, a method for implementing a location area update is provided, which is applied to a UE in an inactive state. In the method, the UE obtains a judgment result by determining whether there is data to be transmitted currently, when a radio access network-based location area update (RLAU) is triggered, where the data to be transmitted is one of service data and signaling data. The UE determines a second message based on the judgment result and a first message, where the first message is an original connection resume request message, and the second message carries a cause value requesting for resuming connection. The UE transmits the second message to a base station.

According to a second aspect of the present disclosure, a method for implementing a location area update is provided, which is applied to a base station, and the method includes: receiving a second message transmitted by a user equipment in an inactive state, wherein the second message carries a cause value requesting for resuming connection; and transmitting a response message to the user equipment based on the cause value, wherein the response message instructs the user equipment whether to switch to a connection state.

According to a third aspect of the embodiments of the present disclosure, an apparatus for implementing a location area update is provided, which is applied to a user equipment in an inactive state, and the apparatus includes: a processor and a memory for storing instructions executable by the processor. The processor is configured to: determine whether there is data to be transmitted currently, when a radio access network-based location area update (RLAU) is triggered, wherein the data to be transmitted is service data or signaling data; determine a second message based on a judgment result determined by the first determining module and a first message, wherein the first message is an original connection resume request message, and the second message carries a cause value requesting for resuming connection; and transmit the second message determined by the second determining module to a base station.

It is to be understood that both the foregoing general description and the following detailed description are exemplary and explanatory only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements, unless otherwise indicated. The implementations set forth in the following exemplary embodiments do not represent all implementations consistent with the present invention. On the contrary, they are merely examples of devices and methods consistent with certain aspects of the present disclosure as detailed in the appended claims.

Figure 1A:
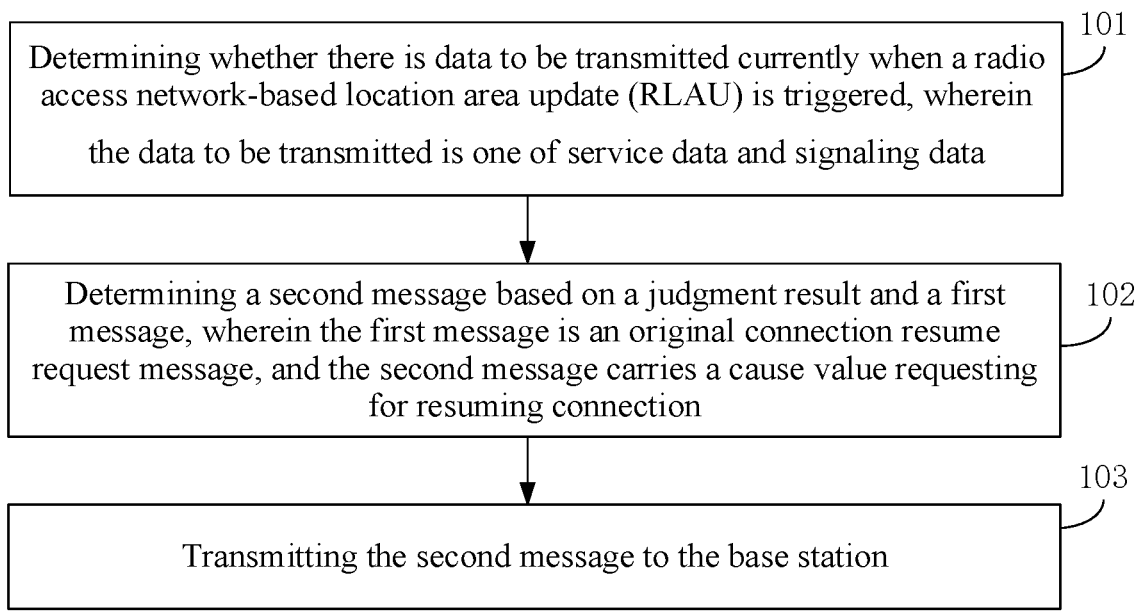
FIG. 1A is a flow diagram of a method for implementing a location area update according to an exemplary embodiment.
Figure 1B:
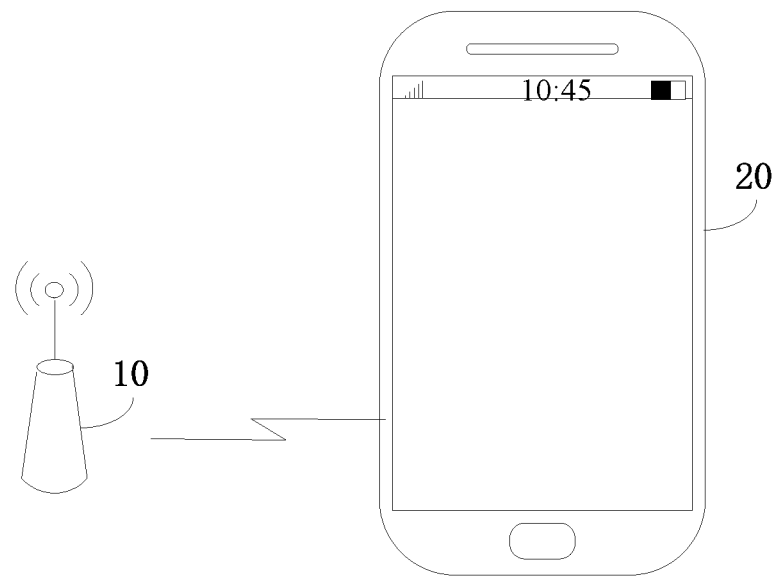
FIG. 1B is an application scenario diagram of a method for implementing a location area update according to an exemplary embodiment.

FIG. 1A is a flow diagram of a method for implementing a location area update according to an exemplary embodiment, and FIG. 1B is an application scenario diagram of a method for implementing a location area update according to an exemplary embodiment; the method for implementing the location area update can be applied to a UE in an active state. As shown in FIG. 1A, the method for implementing the location area update includes the following steps 101 to 103:

In step 101, the UE obtains a judgement result by determining whether there is data to be transmitted currently when a radio access network-based location area update (RLAU) is triggered, where the data to be transmitted is service data or signaling data.

In an embodiment, when the UE in the inactive state moves to re-select a cell, the RLAU operation may be triggered in case that the re-selected residing cell is a cell in a new location area.

In an embodiment, the location area that each cell belongs to may be pre-configured by a base station to the user equipment, or configured by the base station to the user equipment when the user equipment is switched to the inactive state. For instance, cells 1 and 2 belong to a first location area, and cells 3 and 4 belong to a second location area, when the UE in the inactive state re-selects from cell 1 to cell 3, namely the RLAU operation is triggered.

In an embodiment, the data to be transmitted may be service data; in an embodiment, the data to be transmitted may also be non-access stratum (NAS) signaling data.

In step 102, the UE determines a second message based on the judgment result and a first message, where the first message is an original connection resume request message, and the second message carries a cause value requesting for resuming connection.

In an embodiment, the judgment result is used to indicate whether there is data to be transmitted currently.

In an embodiment, the first message is a connection resume request message transmitted to the base station by the UE in the inactive state for resuming radio resource control (RRC) connection; resuming identification information (Resume ID or Context ID) and a message verification code for message integrity protection validation may be carried in the connection resume request message.

In an embodiment, the cause value requesting for resuming connection may include location area update and/or there being data to be transmitted.

Figure 2:
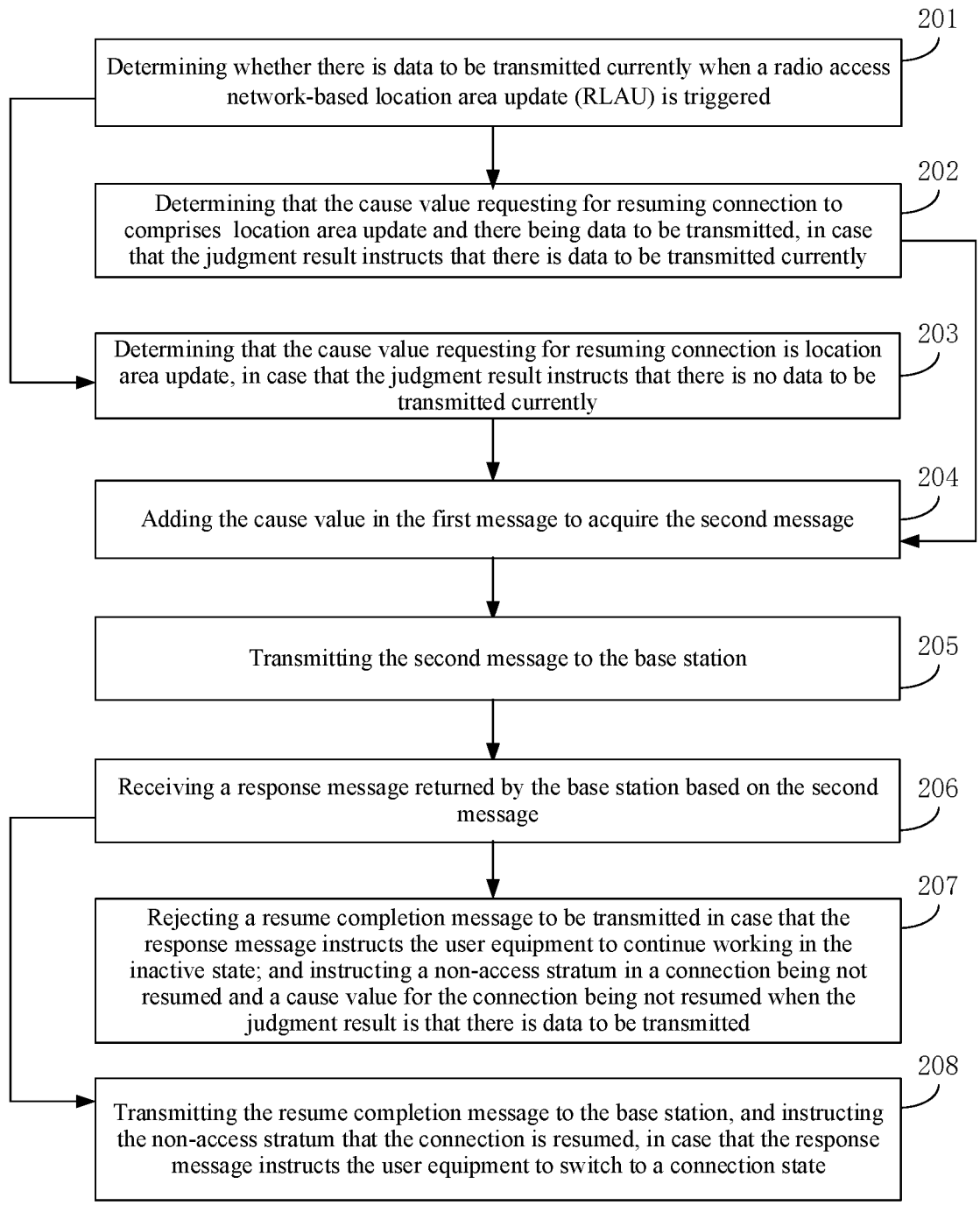
FIG. 2 is a flow diagram of another method for implementing a location area update according to an exemplary embodiment.

In an embodiment, a process of determining the second message based on the judgment result and the first message may refer to the embodiment shown in FIG. 2, which is not described in detail herein.

In step 103, the second message is transmitted to the base station.

In an exemplary scenario, as shown in FIG. 1B, a 5G network is used as a mobile network for exemplary description. The scenario shown in FIG. 1B includes a base station 10 and a UE 20, where when a radio access network-based location area update (RLAU) is triggered by the UE 20 in an inactive state, the UE 20 may further determine whether there is data to be transmitted currently and determine the second message to be transmitted based on the judgment result. For instance, in case that there is data to be transmitted, the second message carries instruction information of location area update and instruction information of there being data to be transmitted; in case that there is no data to be transmitted, the second message only carries the instruction information of the location area update. Therefore, by carrying a cause value for initiating the connection resume request message, the base station 10 is instructed with the cause requesting for resuming an RRC connection, and which in turn enables the base station 10 based on the cause value to determine whether to allow a user equipment to resume a connection state, which avoids unnecessary state transition operation and thus avoids extra signaling overheads.

In this embodiment, with the above steps 101 to 103, the user equipment instructs to the base station with a cause requesting for resuming an RRC connection by carrying a cause value for transmitting a connection resume request message in the connection resume request message, and which in turn enables the base station based on the cause value to determine whether to allow a user equipment to resume a connection state, which avoids unnecessary state transition operation and thus avoids extra signaling overheads.

The technical solutions provided in the embodiments of the present disclosure are described below with specific embodiments.

FIG. 2 is a flow diagram of another method for implementing a location area update according to an exemplary embodiment. With the above-mentioned method provided in the embodiments of the present disclosure, the embodiment takes implementation of location area update by UE as an example for exemplary description. As shown in FIG. 2, the method includes the following steps.

In step 201, when a radio access network-based location area update (RLAU) is triggered, whether there is data to be transmitted currently is determined; in case that the judgment result instructs that there is data to be transmitted currently, step 202 is executed; in case that the judgment result instructs that there is no data to be transmitted currently, step 203 is executed.

In an embodiment, the data to be transmitted is service data or signaling data.

In an embodiment, in case that there is data to be transmitted, it may further instruct a type of the data to be transmitted, such as emergency service data, high-priority service data, mobile-end initiated signaling data, mobile-end initiated data, network-triggered access data (MT-access), delay-tolerant service data, and the like.

In step 202, in case that the cause values requesting for resuming connection are determined to include location area update and there being data to be transmitted, step 204 is executed.

In step 203, the cause value requesting for resuming connection is determined to be the location area update.

In step 204, the cause value is included in the first message to acquire the second message.

In an embodiment, two cause values, the location area update and there being data to be transmitted, may be added in the first message in a form of one field to acquire the second message. For example, the second message is added with the resume connection cause (resumeCause): {field I: RAN-basedNotificationAreaUpdate (location area update); filed II (signaling-data): emergency service, high-priority service, mobile-end initiated signaling, mobile-end initiated data, network-triggered access (MT-access), and delay-tolerant service}. By setting values of the two fields, transmission of the cause value requesting for resuming connection can be implemented.

In an embodiment, two cause values, the location area update and there being data to be transmitted, may be added in the first message in a form of two fields to acquire the second message. For example, the second message is added with the field of resume connection cause (resumeCause), and the value of the filed may be: emergency service data, high-priority service data, mobile-end initiated signaling data, mobile-end initiated data, network-triggered access (MT-access) data, delay-tolerant service data, RAN location area update, RAN location area update+emergency service data, RAN location area update+high-priority service data, RAN location area update+mobile-end initiated data, RAN location area update+mobile-end initiated data, RAN location area update+network-triggered access (MT-access) data, RAN location area update+delay-tolerant service data, or the like. In case that the value of the field resumeCause is the emergency service data, it may be determined that the cause value for initiating a resume connection currently is that there is emergency service data to be transmitted; in case that the value of the field resumeCause is the RAN location area update+emergency service data, it may be determined that the cause value for initiating a resume connection currently is that there is emergency service data to be transmitted and that the location area update occurs simultaneously.

In step 205, the second message is transmitted to the base station.

In step 206, a response message returned by the base station based on the second message is received, step 207 or step 208 is executed.

In step 207, in case that the response message instructs the user equipment to continue working in the inactive state, a resume completion message is rejected to be transmitted; and when the judgment result is that there is data to be transmitted, a non-access stratum is instructed with a connection not resumed and a cause value for the connection not resumed.

In an embodiment, the cause value for the connection not resumed may be network overload or the like, which may be determined based on the cause value given in the response message at the base station side.

In an embodiment, when the response message instructs the user equipment to continue working in the inactive state, the response message may carry the following information: RAN notification area information (cell list or/and notification area identification information), resume identification information resume ID (or context ID), safety information (NextHopChainingCount, next hop chaining count), discontinuous reception (DRX) periodic configuration, idle/inactive mode mobility control information (idleInactiveMode-MoblilityControl, which is used to instruct cell re-selection frequency priority list in an idle/inactive state), instruction information for keeping an inactive state, cause value (overload or others), and waiting time.

In step 208, in case that the response message instructs the user equipment to switch to a connection state, the resume completion message is transmitted to the base station, and the non-access stratum is instructed that the connection is resumed.

In an embodiment, when the response message instructs the user equipment to switch to a connection state, the response message may carry the following information: safety information (NextHopChainingCount, next hop chaining count), measurement configuration information (measConfig), radio configuration information (radioConfigDedicated), other configuration (OtherConfig) information, entering the connection state instruction information and instruction information for maintaining the header compression method of the data (drb-ContinueROHC).

In an embodiment, after the user equipment transmits the resume completion message to the base station, the switch between the inactive state and the connection state is completed, which may instruct to the non-access stratum that the connection is resumed, thus implementing the transmission of signaling data.

This embodiment provides a way to instruct a cause value requesting for resuming connection via a connection resume request message, for instance, a way to instruct two causes, which are the location area update and there being data to be requested, with one or two fields, avoids unnecessary state transition operation. In addition, the user equipment may also determine whether to transmit a resume completion message based on the response message of the base station. For instance, the user equipment may reject to transmit a resume completion message when the response message instructs to continue working in the inactive state, which reduces the number of signaling overheads.

Figure 3:
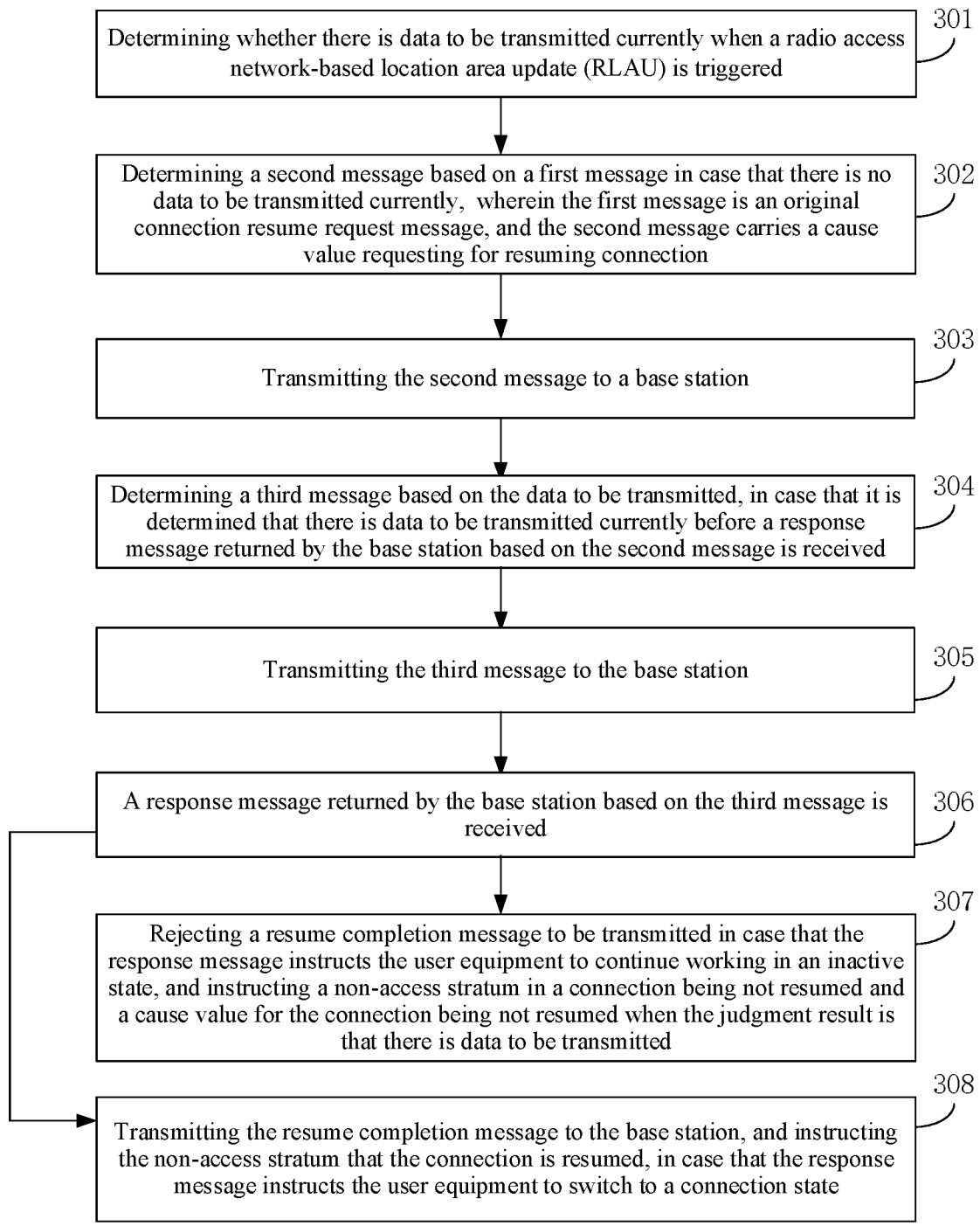
FIG. 3 is a flow diagram of yet another method for implementing a location area update according to an exemplary embodiment.

FIG. 3 is a flow diagram of yet another method for implementing a location area update according to an exemplary embodiment. With the above-mentioned method provided in the embodiments of the present disclosure, the embodiment takes implementation of location area update by UE as an example for exemplary description. As shown in FIG. 3, the method includes the following steps.

In step 301, when a radio access network-based location area update (RLAU) is triggered, whether there is data to be transmitted is determined currently.

In an embodiment, the data to be transmitted is service data or signaling data.

In step 302, in case that there is no data to be transmitted currently, a second message is determined based on a first message, where the first message is an original connection resume request message, and the second message carries a cause value requesting for resuming connection.

In step 303, the second message is transmitted to a base station.

In step 304, in case that it is determined that there is data to be transmitted currently before a response message returned by the base station based on the second message is received, a third message is determined based on the data to be transmitted.

In an embodiment, it may be added in the original connection resume request message that the causes for initiating the resume connection request are cause values of location area update and there being data to be transmitted, to acquire the third message.

In step 305, the third message is transmitted to the base station.

In step 306, a response message returned by the base station based on the third message is received, step 307 or step 308 is executed.

In step 307, in case that the response message instructs the user equipment to continue working in an inactive state, a resume completion message is rejected to be transmitted; and when the judgment result is that there is data to be transmitted, a non-access stratum is instructed with a connection not resumed and a cause value for the connection not resumed.

In step 308, in case that the response message instructs the user equipment to switch to a connection state, a resume completion message is transmitted to the base station, and the non-access stratum is instructed that the connection is resumed.

In an embodiment, it may refer to the description of steps 207 and 208 in the embodiment shown in FIG. 2 for the description of steps 307 and 308, and the details are not described herein.

In this embodiment, a connection resume request message may be re-transmitted in case that the response message returned by the base station has not been received, namely it is determined that there is data to be transmitted, after the UE initiates the connection resume request message due to the location area update, where two cause values, there being data to be transmitted currently and the location area update, are instructed, which enables the base station to determine whether to control the UE switch to the connection state based on the connection resume request message, which avoids a problem of data transmission delay caused by the inability to switch the state when state switching is required.

Figure 4:
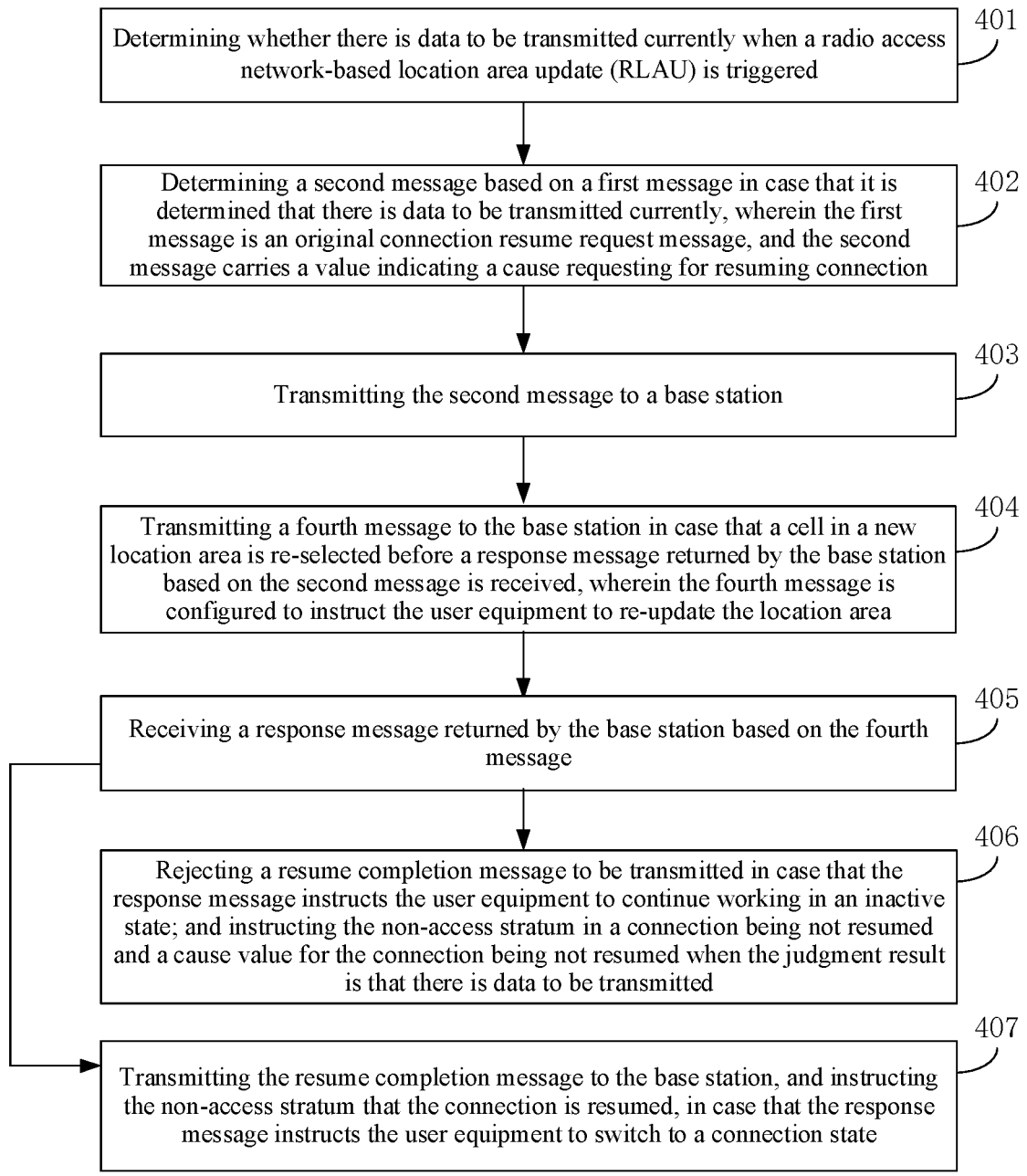
FIG. 4 is a flow diagram of yet another method for implementing a location area update according to an exemplary embodiment.

FIG. 4 is a flow diagram of yet another method for implementing a location area update according to an exemplary embodiment. With the above-mentioned method provided in the embodiments of the present disclosure, the embodiment takes implementation of location area update by UE as an example for exemplary description. As shown in FIG. 4, the method includes the following steps.

In step 401, when a radio access network-based location area update (RLAU) is triggered, whether there is data to be transmitted currently is determined.

In an embodiment, the data to be transmitted is service data or signaling data.

In step 402, a second message is determined based on a judgment result and a first message, where the first message is an original connection resume request message, and the second message carries a value indicating a cause requesting for resuming connection.

In step 403, the second message is transmitted to a base station.

In an embodiment, it may refer to the description of steps 101 to 103 in the embodiment shown in FIG. 1A for the description of steps 401 to 403, and details are not described herein.

In step 404, in case that a cell in a new location area is re-selected before a response message returned by the base station based on the second message is received, a fourth message is transmitted to the base station, where the fourth message is used to instruct the user equipment to re-update the location area.

In an embodiment, in case that the judgment result of step 401 instructs that there is data to be transmitted, it may instruct in the fourth message with two cause values, there being data to be transmitted and location area update; in an embodiment, in case that the judgment result of step 401 instructs that there is no data to be transmitted, it may instruct the location area update in the fourth message.

In step 405, a response message returned by the base station based on the fourth message is received, step 406 or step 407 is executed.

In step 406, in case that the response message instructs the user equipment to continue working in an inactive state, a resume completion message is rejected to be transmitted; and when the judgment result is that there is data to be transmitted, the non-access stratum is instructed with a connection not resumed and a cause value for the connection not resumed.

In step 407, in case that the response message instructs the user equipment to switch to a connection state, a resume completion message is transmitted to the base station, and the non-access stratum is instructed that the connection is resumed.

In this embodiment, a connection resume request message may be re-transmitted in case that the response message returned by the base station has not been received, namely it is determined that the location area update re-occurs, after the UE initiates the connection resume request message due to the location area update, which enables the base station to return the response message of the connection resume request message re-transmitted based on the user equipment, which avoids a problem of large signaling overhead caused by the response message returned specific to the connection resume request message being transmitted for two times.

Figure 5:
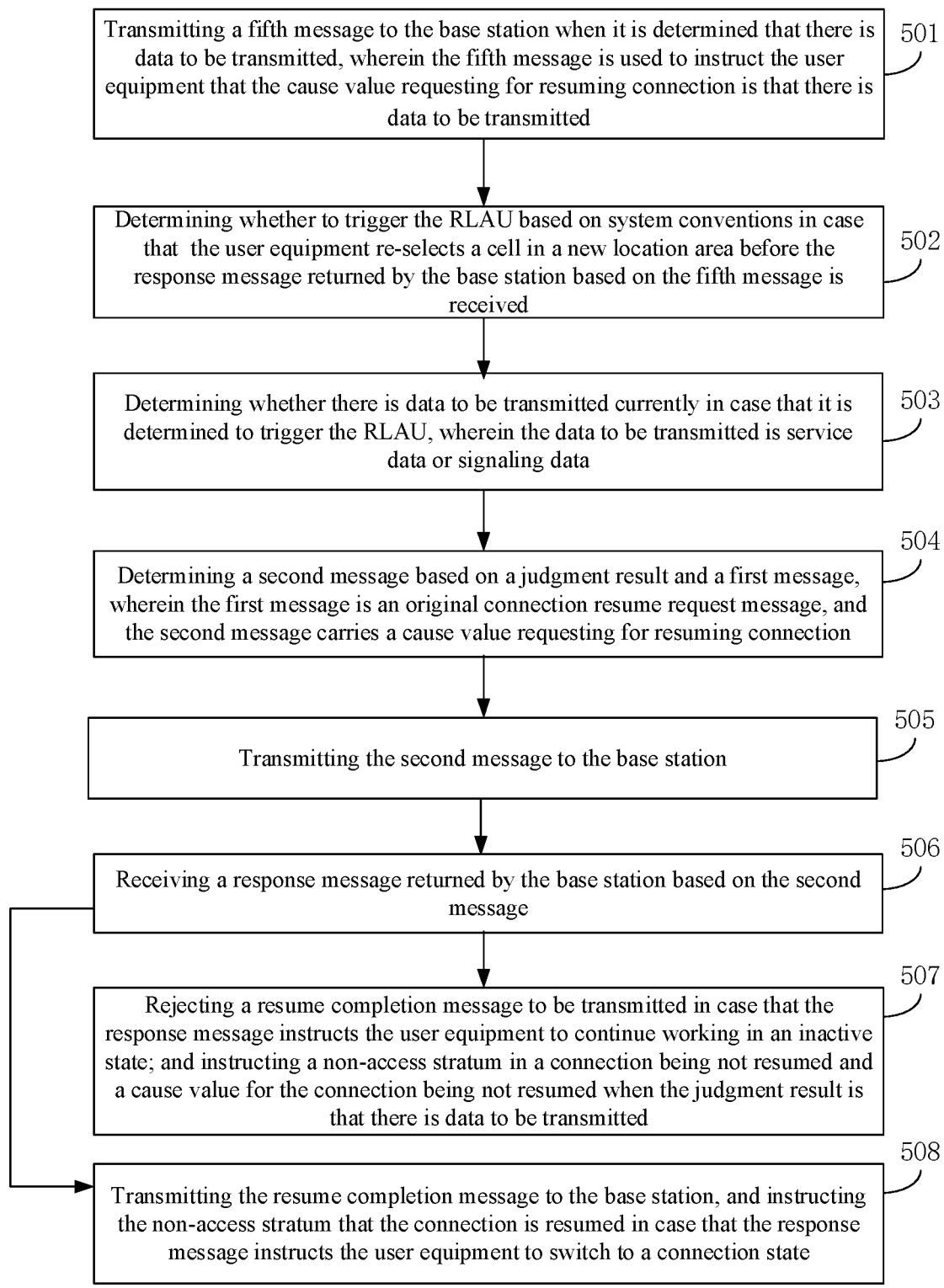
FIG. 5 is a flow diagram of yet another method for implementing a location area update according to an exemplary embodiment.

FIG. 5 is a flow diagram of yet another method for implementing location area update according to an exemplary embodiment. With the above-mentioned method provided in the embodiments of the present disclosure, the embodiment takes implementation of location area update by UE as an example for exemplary description. As shown in FIG. 5, the method includes the following steps.

In step 501, when it is determined that there is data to be transmitted, a fifth message is transmitted to the base station, where the fifth message is used to instruct the user equipment that the cause value requesting for resuming connection is that there is data to be transmitted.

In step 502, in case that the user equipment re-selects a cell in a new location area before the response message returned by the base station based on the fifth message is received, it is determined whether to trigger the RLAU based on system conventions.

In an embodiment, the system conventions may be understood as communication protocol standards. In case that it is specified in the protocol standards that the user equipment does not need to periodically trigger the RLAU, after initiating the connection resume request due to there being data to be transmitted and before receiving the response message, the RLAU is not trigger even if location area update occurs in the user equipment, namely the connection resume request message will not be re-transmitted before the response message is received; in an embodiment, in case that it is specified in the protocol standards that the user equipment may continue to periodically trigger the RLAU, after initiating the connection resume request due to there being data to be transmitted and before receiving the response message, it may determine to trigger the RLAU after the location area update occurs in the user equipment, and then re-transmit the connection resume request message.

In step 503, in case that it is determined to trigger the RLAU, whether there is data to be transmitted currently is determined, where the data to be transmitted is service data or signaling data.

In step 504, a second message is determined based on a judgment result and a first message, where the first message is an original connection resume request message, and the second message carries a cause value requesting for resuming connection.

In step 505, the second message is transmitted to the base station.

In step 506, a response message returned by the base station based on the second message is received, step 507 or step 508 is executed.

In step 507, in case that the response message instructs the user equipment to continue working in an inactive state, a resume completion message is rejected to be transmitted; and when the judgment result is that there is data to be transmitted, a non-access stratum is instructed with a connection not resumed and a cause value for the connection not resumed.

In step 508, in case that the response message instructs the user equipment to switch to a connection state, a resume completion message is transmitted to the base station, and the non-access stratum is instructed that the connection is resumed.

In this embodiment, it may be determined whether to trigger the RLAU based on the system conventions, and thus whether to re-transmit the connection resume request message, in case that the response message returned by the base station has not been received, namely it is determined that the location area update re-occurs, after the UE initiates the connection resume request message due to the location area update, which solves the problem that the UE implements the location area update when the area update occurs and provides a solution to implement the area update when the area update and data transmission operation occur simultaneously.

Figure 6:
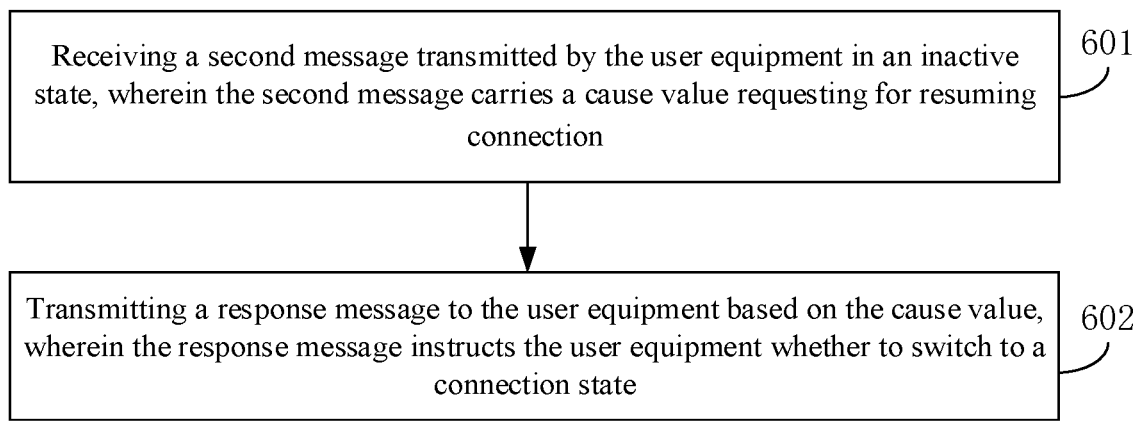
FIG. 6 is a flow diagram of a method for implementing a location area update according to an exemplary embodiment.

FIG. 6 is a flow diagram of a method for implementing a location area update according to an exemplary embodiment. The method for implementing the location area update can be applied to a base station. As shown in FIG. 6, the method for implementing the location area update includes the following steps 601 to 602.

In step 601, a second message transmitted by the user equipment in an inactive state is received, wherein the second message carries a cause value requesting for resuming connection.

In an embodiment, the second message is the connection resume request message, where the cause values requesting for resuming connection, such as location area update and/or there being data to be transmitted, are carried.

In step 602, a response message is transmitted to the user equipment based on the cause value, where the response message instructs the user equipment whether to switch to a connection state.

In an embodiment, the base station may instruct the user equipment to continue working in the inactive state in case that the cause value is the location area update, which avoids unnecessary state transition operation; in an embodiment, the base station may determine whether to control the user equipment to switch to a connection state based on the current network state information and the type of the data to be transmitted, in case that the cause values are the location area update and there being data to be transmitted. For specific implementation, refer to the embodiment described in FIG. 7, which is not described in detail herein.

In an exemplary scenario, as shown in FIG. 1B, a 5G network is used as a mobile network for exemplary description. The scenario shown in FIG. 1B includes a base station 10 and a UE 20, where when a radio access network-based location area update (RLAU) is triggered in the UE 20 in an inactive state, the UE 20 can further determine whether there is data to be transmitted currently and determine the second message to be transmitted based on a judgment result. For instance, in case that there is data to be transmitted, the second message carries instruction information of location area update and instruction information of there being data to be transmitted; in case that there is no data to be transmitted, the second message only carries the instruction information of location area update. The base station 10 may determine whether to allow the user equipment to resume a connection state based on the cause requesting for resuming RRC connection by the user equipment 20, which avoids unnecessary state transition operation and thus avoids extra signaling overheads.

In this embodiment, with the above steps 601 to 602, the base station may determine whether to allow the user equipment to resume a connection state based on the cause value in the connection resume request message, which avoids unnecessary state transition operation and thus avoids extra signaling overheads.

For details on how to implement the location area update, please refer to the subsequent embodiments.

The technical solutions provided in the embodiments of this disclosure are described below with specific embodiments.

Figure 7:
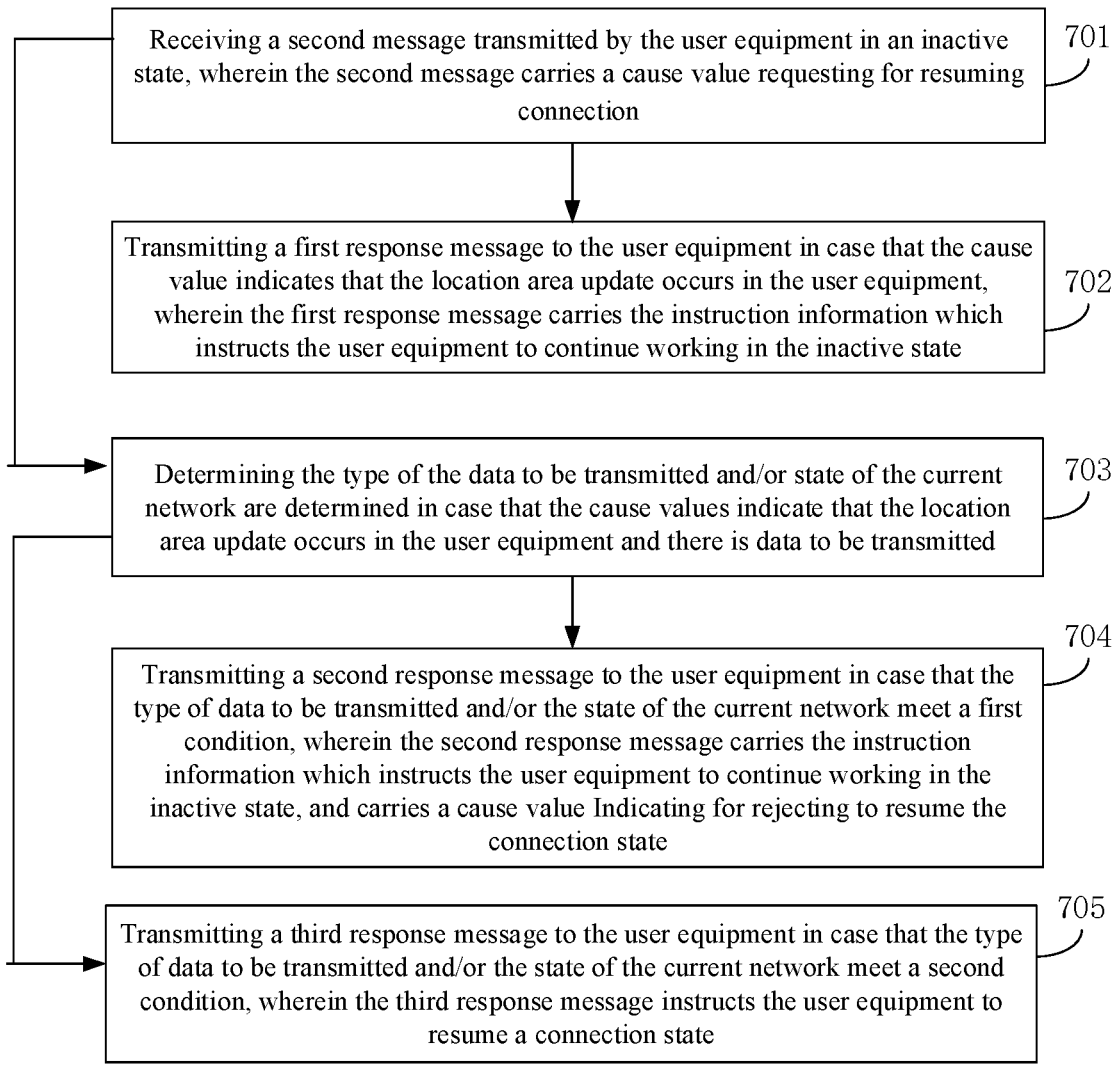
FIG. 7 is a flow diagram of yet another method for implementing a location area update according to an exemplary embodiment.

FIG. 7 is a flow diagram of yet another method for implementing a location area update according to an exemplary embodiment. With the above-mentioned method provided in the embodiments of the present disclosure, the embodiment takes how a base station executes to implement location area update of the user equipment as an example for exemplary description. As shown in FIG. 7, the method includes the following steps.

In step 701, a second message transmitted by the user equipment in an inactive state is received, where the second message carries a cause value requesting for resuming connection, to execute step 702 or step 703.

In step 702, a first response message is transmitted to the user equipment in case that the cause value is that the location area update occurs in the user equipment, where the first response message carries the instruction information which instructs the user equipment to continue working in the inactive state.

In an embodiment, the user equipment does not need to be switched to the connection state usually when the user equipment only needs to update the location area and there is no data to be transmitted; therefore, the base station may transmit instruction information which instructs the user equipment to continue working in the inactive state, when a connection resume request message, which is initiated due to the occurrence of the location area update, is received.

In step 703, in case that the cause values are that the location area update occurs in the user equipment and there being data to be transmitted, a type of the data to be transmitted and/or state of the current network are determined, step 704 or step 705 is executed.

In an embodiment, the type of the data to be transmitted may be emergency service data, high-priority service data, mobile-end initiated signaling data, mobile-end initiated data, network-triggered access data (MT-access) and delay-tolerant service data. Different types of data have different priorities. For example, the priority of emergency service data is higher than that of delay-tolerant service data.

In an embodiment, the state of the current network may be used to determine whether to allow the UE to switch to the connection state. Network load or the strength of the network signal may be used to measure the state of the network. For example, in case that the network state is overloaded, the UE may temporarily not be allowed to enter the connection state; in case that the network state is in normal load, the UE may be allowed to enter the connection state.

In step 704, a second response message is transmitted to the user equipment in case that the type of the data to be transmitted and/or the state of the current network meet a first condition, where the second response message carries the instruction information which instructs the user equipment to continue working in the inactive state, and carries a cause value indicating for rejecting to resume the connection state.

In an embodiment, the first condition is used to instruct a condition that is not suitable for switching the UE to the connection state. For example, in case that the type of the data to be transmitted is delay-tolerant service data, and the state of the current network is overloaded, it may be determined that the first condition is met, thus temporarily not allowing the UE to enter the connection state.

In an embodiment, the second response message may carry any of the following information: RAN notification area information (cell list or/and notification area identification information), resume identification information resume ID (or context ID), safety information (NextHop-ChainingCount, next hop chaining count), discontinuous reception (DRX) periodic configuration, idle/inactive mode mobility control information (idleInactiveModeMoblility-Control, used to instruct cell re-selection frequency priority list in an idle/inactive state), instruction information for keeping an inactive state, cause value (overload, others), and waiting time.

In step 705, a third response message is transmitted to the user equipment in case that the type of the data to be transmitted and/or the state of the current network meet a second condition, where the third response message instructs the user equipment to resume a connection state.

In an embodiment, the second condition is used to instruct a condition that is suitable for switching the UE to the connection state. For example, in case that the type of the data to be transmitted is emergency service data, and the current network is in a state of normal network load, it may be determined that the second condition is met, thus allowing the UE to enter the connection state.

In an embodiment, the third response message may carry any of the following information: safety information (NextHopChainingCount, next hop chaining count), measurement configuration information (measConfig), radio configuration information (radioConfigDedicated), other configuration (OtherConfig) information, instruction information of entering the connection state and instruction information for maintaining the header compression method of the data (drb-ContinueROHC).

In an embodiment, in steps 704 and 705, different weight coefficients can be configured to the type of the data to be transmitted and the state of network. For example, the weight coefficient for the type of the data to be transmitted is 0.7 and that for the state of network is 0.3, and the corresponding state switching measurement values are configured for each type of the data and state of network, thereby calculating the state switching values corresponding to the type of the data to be transmitted currently and the state of current network. In case that the state switching value is smaller than a preset switching threshold, it may be determined that the first condition is met, temporarily not allowing the UE to enter a connection state; in case that the state switching value is greater than the preset switching threshold, it may be determined that the second condition is met, allowing the UE to enter the connection state. For example, in case that the data to be transmitted is delay-tolerant service data, the corresponding state switching measurement value is 3, the state of network is overloaded, the corresponding state switching measurement value is 2, and the preset switching threshold is 5, then the first condition is met as the state switching value is 3×0.7+2× 0.3=2.7, which is smaller than 5, not allowing the UE to enter the connection state; for another example, in case that the data to be transmitted is emergency service data, the corresponding state switching measurement value is 7, the state of network is normally loaded, the corresponding state switching measurement value is 7, and the preset switching threshold is 5, then the second condition is met as the state switching value is 7×0.7+7×0.3=7, which is greater than 5, allowing the UE to enter the connection state.

In this embodiment, the base station may determine whether to resume the connection state of the UE based on the cause value in the connection resume request message and the state of network. When it is not necessary to resume the connection state, the UE is instructed to continue working in an inactive state via the response message, which avoids unnecessary state transition operation, and thus avoids extra signaling overheads.

Figure 8:
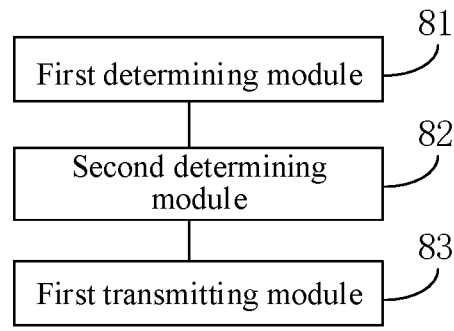
FIG. 8 is a block diagram of an apparatus for implementing a location area update according to an exemplary embodiment.

FIG. 8 is a block diagram of an apparatus for implementing a location area update according to an exemplary embodiment. The apparatus for implementing the location area update, which is applied to a user equipment, as shown in FIG. 8, includes:

a first determining module 81, configured to determine whether there is data to be transmitted currently, when a radio access network-based location area update (RLAU) is triggered, where the data to be transmitted is service data or signaling data;

a second determining module 82, configured to determine a second message based on the judgment result determined by the first determining module 81 and a first message, where the first message is an original connection resume request message, and the second message carries a cause value requesting for resuming connection; and a first transmitting module 83, configured to transmit the second message determined by the second determining module 82 to the base station.

In this embodiment, by carrying the cause value requesting for resuming connection in the second message, it may be ensured that the base station does not switch the connection state for the user equipment when the user equipment does not need to resume the RRC connection, which avoids unnecessary state transition operation.

Figure 9:
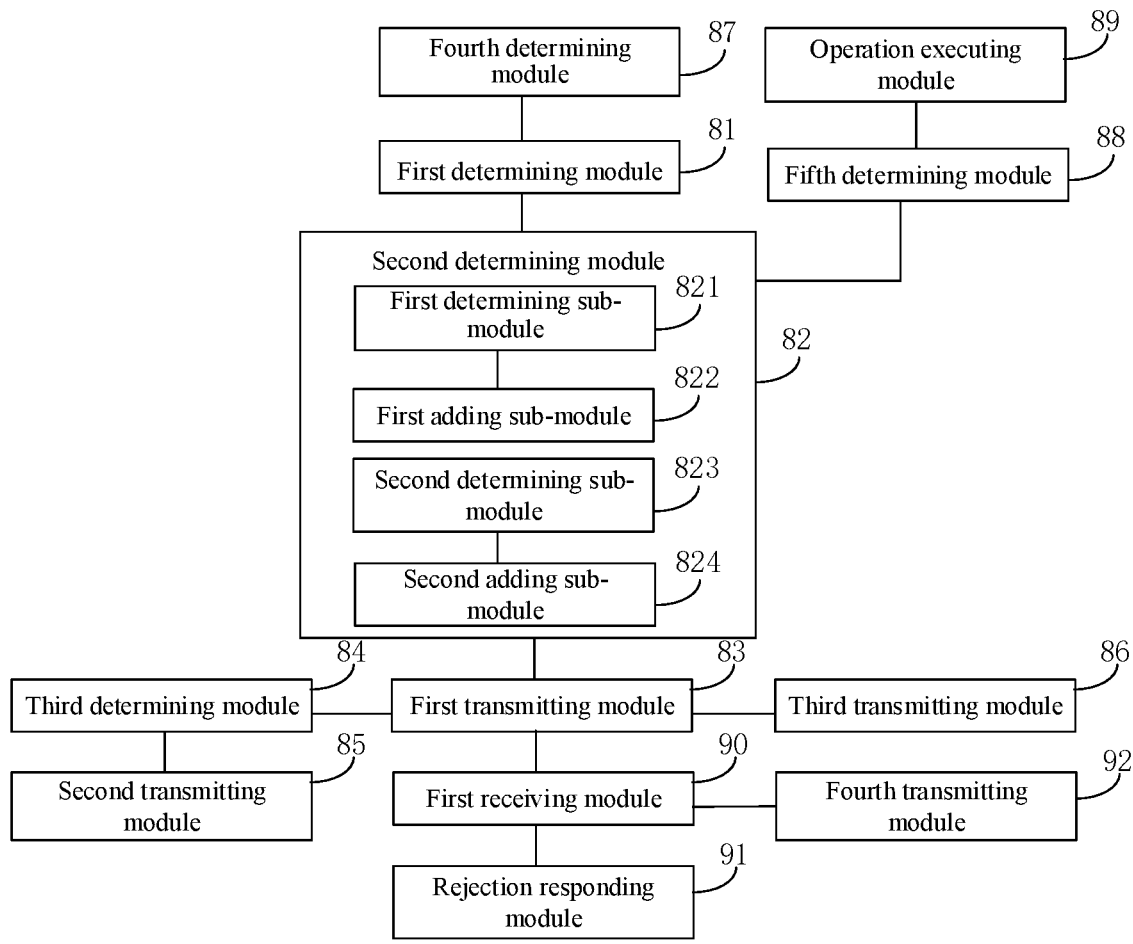
FIG. 9 is a block diagram of another apparatus for implementing a location area update according to an exemplary embodiment.

FIG. 9 is a block diagram of another apparatus for implementing a location area update according to an exemplary embodiment. As shown in FIG. 9, based on the embodiment shown in FIG. 8, in an embodiment, the second determining module 82 includes:

a first determining sub-module 821, configured to determine that the cause values requesting for resuming connection include location area update and there being data to be transmitted, in case that the judgment result instructs that there is data to be transmitted currently.

a first adding sub-module 822, configured to add the cause value in the first message to acquire a second message.

In this embodiment, by simultaneously instructing the location area update and there being data to be transmitted, a problem that the area update cannot be implemented when the area update and the data transmission operation occur simultaneously in the related art is solved.

In an embodiment, in case that the judgment result instructs that there is data to be transmitted currently, the second message further carries a type of the data to be transmitted.

In this embodiment, it may be ensured that the base station determines whether not to temporarily switch to the connection state based on the type of the data to be transmitted. For example, in case that the data to be transmitted is delay-tolerant service data and the state of network is blocked, the UE may temporarily not be instructed to switch to the connection state, thus trying to avoid a problem of network congestion caused by the overloaded network.

In an embodiment, the data to be transmitted is emergency service data, or high-priority service data, or user-equipment initiated signaling data, or user-equipment initiated service data, or network-triggered access data (MT-access), or delay-tolerant service data.

In this embodiment, multiple types of the data to be transmitted are disclosed, which may ensure that the base station can more accurately configure the corresponding state of network for the user equipment based on the type of the data, and can configure corresponding wireless link resources to the user equipment based on the type of the data to be transmitted when it is determined that the user equipment is switched to the connection state.

In an embodiment, the first adding sub-module is configured to add two cause values, the location area update and there being data to be transmitted, in the form of one field in the first message to acquire the second message; or add two cause values, the location area update and there being data to be transmitted, in the form of two fields in the first message to acquire the second message.

In this embodiment, two implementation modes for transmitting two cause values, the location area update and there being data to be transmitted, are provided.

In an embodiment, the second determining module 82 includes:

a second determining sub-module 823, configured to determine that the cause value requesting for resuming connection is location area update, in case that the judgment result instructs that there is no data to be transmitted currently;

a second adding sub-module 824, configured to add the cause value in the first message to acquire the second message.

In this embodiment, by instructing to the base station that the cause value for currently initiating to resume connection is the location area update, the base station may be instructed to implement location area update without switching the UE to the connection state, which avoids unnecessary state transition operation and reduces the number of signaling interaction operations.

In an embodiment, the apparatus further includes:

a third determining module 84, configured to determine a third messaged based on the data to be transmitted, in case that it is determined that there is data to be transmitted before a response message returned by the base station based on the second message is received;

a second transmitting module 85, configured to transmit the third message to the base station.

In this embodiment, a connection resume request message may be re-transmitted in case that the response message returned by the base station has not been received, namely it is determined that there is data to be transmitted, after the UE initiates the connection resume request message due to the location area update, where two cause values, there being data to be transmitted currently and the location area update, are instructed, which enables the base station to determine whether to control the UE switch to the connection state based on the connection resume request message, which avoids a problem of data transmission delay caused by the inability to switch the state when state switching is required.

In an embodiment, the apparatus further includes:

a third transmitting module 86, configured to transmit a fourth message to the base station, in case that a cell in a new location area is re-selected before a response message returned by the base station based on the second message is received, where the fourth message is used to instruct the user equipment to re-update the location area.

In this embodiment, a connection resume request message may be re-transmitted in case that the response message returned by the base station has not been received, namely it is determined that the location area update re-occurs, after the UE initiates the connection resume request message due to the location area update, which enables the base station to return the response message of the connection resume request message re-transmitted based on the user equipment, which avoids a problem of large signaling overhead caused by the response message returned specific to the connection resume request message being transmitted for two times.

In an embodiment, the apparatus further includes:

a fourth determining module 87, configured to determine to trigger the RLAU, in case that the user equipment re-selects a cell in a new location area.

In an embodiment, the apparatus further includes:

a fifth determining module 88, configured to determine whether to trigger the RLAU based on the system conventions, in case that the user equipment re-selects a cell in a new location area after a fifth message is transmitted to the base station and before a response message returned by the base station based on the fifth message is received, where the fifth message is used to instruct that the cause value requesting for resuming connection of the user equipment is that there is data to be transmitted; and an operation executing module 89, configured to execute an operation step for determining whether there is data to be transmitted currently, when a radio access network-based location area update (RLAU) is triggered, where the data to be transmitted is service data or signaling data, in case that it is determined to trigger the RLAU.

In this embodiment, it may be determined whether to trigger the RLAU based on the system conventions, and thus whether to re-transmit the connection resume request message, in case that the response message returned by the base station has not been received, namely it is determined that the location area update re-occurs, after the UE initiates the connection resume request message due to the location area update, which solves the problem that the UE implements the location area update when the area update occurs and provides a solution to implement the area update when the area update and data transmission operation occur simultaneously.

In an embodiment, the apparatus further includes:

a first receiving module 90, configured to receive a response message returned by the base station based on the second message;

a rejection responding module 91, configured to reject to transmit a resume completion message in case that the response message instructs the user equipment to continue working in the inactive state, and instruct to the non-access stratum in a connection not resumed and a cause value for the connection not resumed when the judgment result is that there is data to be transmitted;

a fourth transmitting module 92, configured to transmit a resume completion message to the base station, and instruct to the non-access stratum that the connection is resumed, in case that the response message instructs the user equipment to switch to a connection state.

In this embodiment, the user equipment may determine whether to transmit a resume completion message based on the response message of the base station. For instance, the user equipment may reject to transmit a resume completion message when the response message instructs to continue working in the inactive state, which reduces the signaling overheads.

Figure 10:
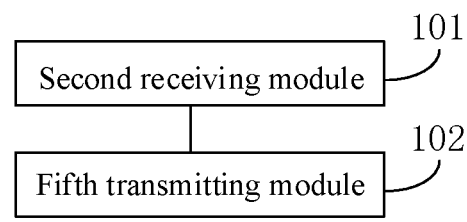
FIG. 10 is a block diagram of an apparatus for implementing a location area update according to an exemplary embodiment.

FIG. 10 is a block diagram of an apparatus for implementing a location area update according to an exemplary embodiment. The apparatus for implementing the location area update, which is applied to a base station, as shown in FIG. 10, includes:

a second receiving module 101, configured to receive a second message transmitted by a user equipment in an inactive state, where the second message carries a cause value requesting for resuming connection; and a fifth transmitting module 102, configured to transmit a response message to the user equipment based on the cause value carried in the second message which is received by the second receiving module, where the response message instructs the user equipment whether to switch to a connection state.

In this embodiment, the base station may determine whether to allow the user equipment to resume a connection state based on the cause value in the connection resume request message, which avoids unnecessary state transition operation and thus avoids extra signaling overheads.

Figure 11:
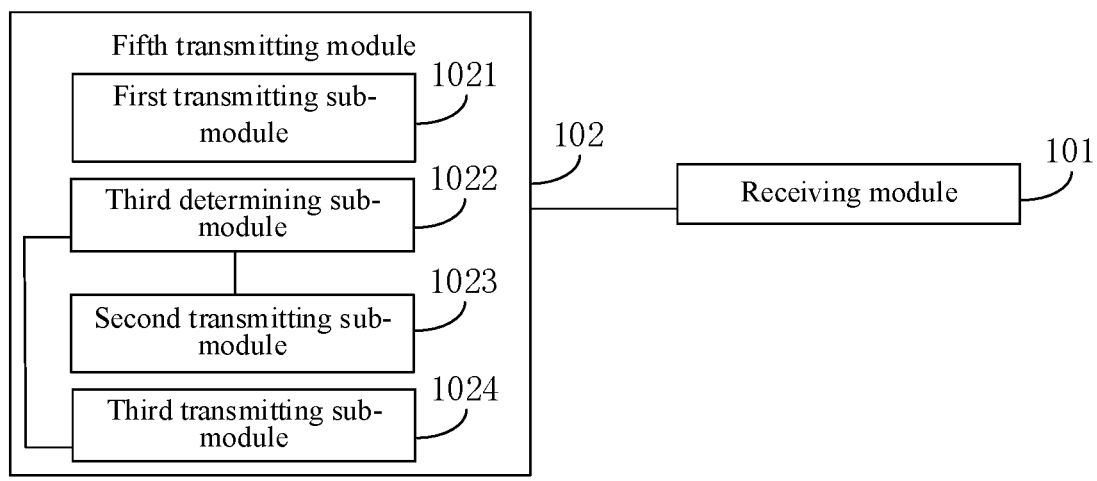
FIG. 11 is a block diagram of another apparatus for implementing a location area update according to an exemplary embodiment.

FIG. 11 is a block diagram of an apparatus for implementing a location area update according to an exemplary embodiment. As shown in FIG. 11, based on the embodiment shown in FIG. 10, in an embodiment, the fifth transmitting module 102 includes:

a first transmitting sub-module 1021, configured to transmit a first response message to the user equipment in case that the cause value is that location area update occurs in the user equipment, where the first response message carries an instruction information which instructs the user equipment to continue working in the inactive state.

In this embodiment, the base station may determine whether to resume the connection state of the UE based on the cause value in the connection resume request message and the state of network, and instruct the UE to continue working in an inactive state via the response message when it is not necessary to resume the connection state, which avoids the unnecessary state transition operation, and thus avoids extra signaling overheads.

In an embodiment, the fifth transmitting module 102 includes:

a third determining sub-module 1022, configured to determine a type of the data to be transmitted and/or state of the current network, in case that the cause values are that location area update occurs in the user equipment and that there being data to be transmitted;

a second transmitting sub-module 1023, configured to transmit a second response message to the user equipment in case that the type of the data to be transmitted and/or the state of the current network meet a first condition, where the second response message carries the instruction information which instructs the user equipment to continue working in the inactive state, and carries a cause value indicating for rejecting to resume the connection state;

a third transmitting sub-module 1024, configured to transmit a third response message to the user equipment in case that the type of the data to be transmitted and/or the state of the current network meet a second condition, where the third response message instructs the user equipment to resume the connection state.

In this embodiment, the base station may determine whether to resume the connection state of the UE based on the cause value in the connection resume request message and the state of network, instruct the UE to continue working in an inactive state via the response message when it is not necessary to resume the connection state, which avoids unnecessary state transition operation, and instruct the UE to switch to a connection state via the response message when it is necessary to resume the connection state, which ensures the normal transmission of service data and signaling data for the user equipment.

Figure 12:
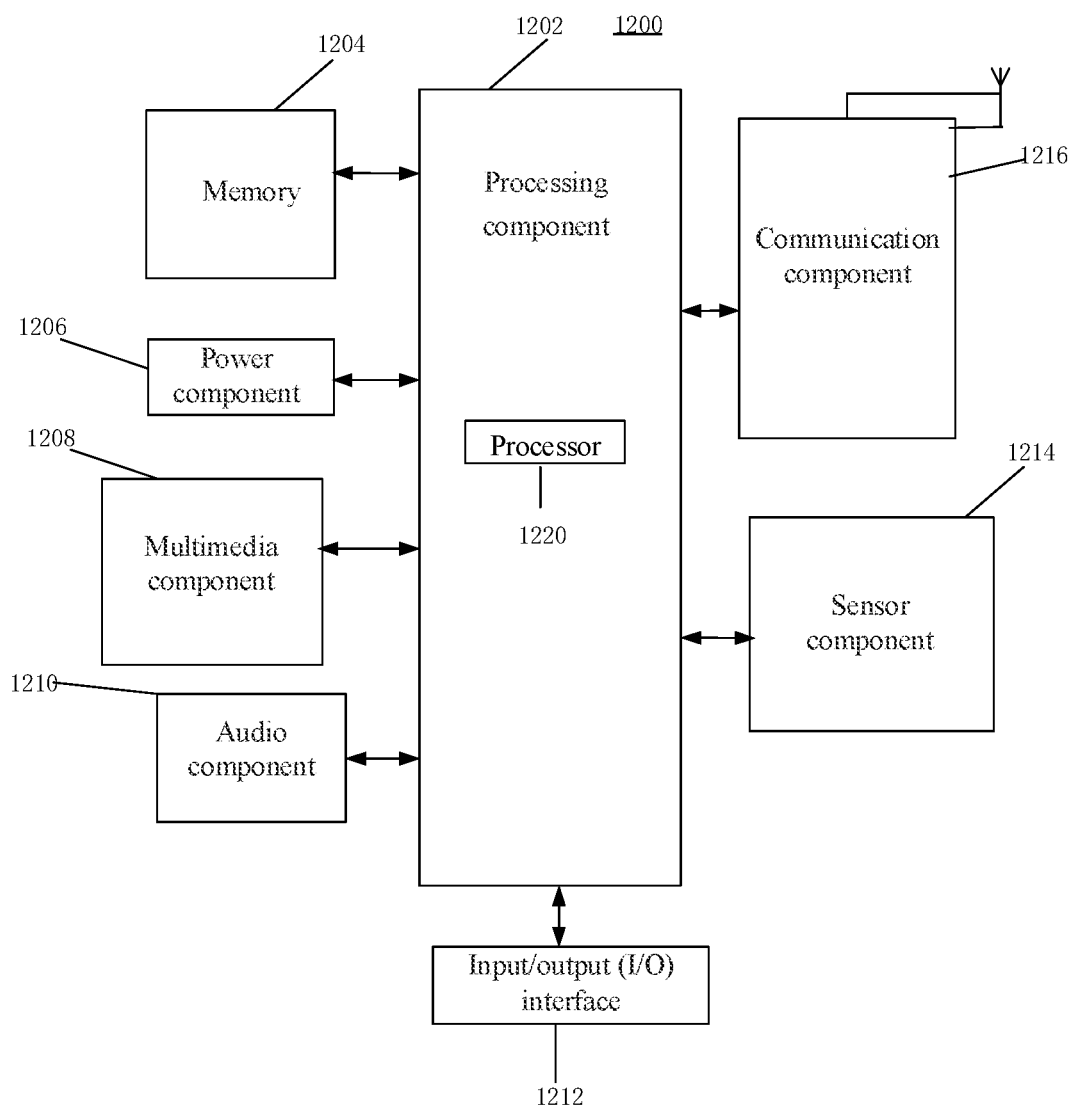
FIG. 12 is a block diagram of an apparatus applied to implement a location area update according to an exemplary embodiment.

FIG. 12 is a block diagram of an apparatus applied to implement a location area update according to an exemplary embodiment. For example, the apparatus 1200 may be a mobile phone, a computer, a digital broadcasting terminal, a message transceiver device, a game console, a tablet device, medical equipment, fitness equipment, a personal digital assistant, and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). In case that the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1208 includes a front camera and/or a rear camera. The front camera and the rear camera may receive external multimedia data when the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC), the microphone configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but not limited to, a home button, a volume button, a starting button, and a locking button.

The sensor component 1214 includes one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a complementary metal oxide semiconductor (CMOS) or charge-coupled device (CCD) image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate wired or wireless communications between the apparatus 1200 and other devices. The apparatus 1200 may access a wireless network based on a communication standard, such as Wi-Fi, 2G or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for executing the above methods.

In exemplary embodiments, there is also provided a non-transitory computer readable storage medium including instructions, such as the memory 1204 including instructions. These instructions may be executed by the processor 1220 in the apparatus 1200 for executing the method described in the above first aspect: determining whether there is data to be transmitted currently, when a radio access network-based location area update (RLAU) is triggered, where the data to be transmitted is service data or signaling data; determining a second message based on a termination result and a first message, where the first message is an original connection resume request message, and the second message carries a cause value requesting for resuming connection; and transmitting the second message to the base station.

In an embodiment, the non-transitory computer-readable storage medium may be a ROM, a RAM, a CD-ROM, a magnetic tape, a floppy disc, an optical data storage device, or the like.

Figure 13:
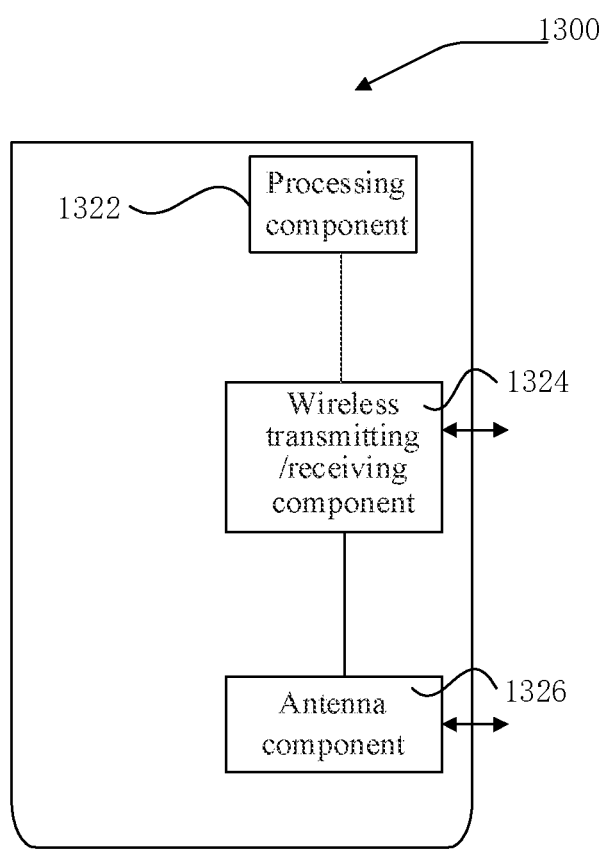
FIG. 13 is a block diagram of an apparatus applied to implement a location area update according to an exemplary embodiment.

FIG. 13 is a block diagram of a data transmitting apparatus according to an exemplary embodiment. The apparatus 1300 may be provided as a base station. Referring to FIG. 13, the apparatus 1300 includes a processing component 1322, a wireless transmitting/receiving component 1324, an antenna component 1326 and a signal processing portion specific to wireless interfaces. The processing component 1322 may further include one or more processors.

One processor of the processing component 1322 may be configured to execute the method for implementing the location area update described in the above second aspect.

In exemplary embodiments, there is also provided a non-transitory computer readable storage medium including instructions. These instructions may be executed by the processing component 1322 in the apparatus 1300 for executing the above method described in the above second aspect. For example, the non-transitory computer-readable storage medium may be a ROM, a RAM, a CD-ROM, a magnetic tape, a floppy disc, an optical data storage device, or the like.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for implementing a location area update, comprising:
obtaining, by a user equipment in an inactive state, a judgement result by determining whether there is data to be transmitted from the user equipment currently, when a radio access network-based location area update (RLAU) is triggered, wherein the data to be transmitted is one of service data and signaling data;
based on the judgment result and a first message, determining, by the user equipment in an inactive state, a second message, wherein the first message is an original connection resume request message, and the second message carries a cause value requesting for resuming connection;
transmitting, by the user equipment in an inactive state, the second message to a base station; and
receiving, by the user equipment, a response message sent by the base station based on the cause value, wherein the response message instructs the user equipment whether to switch to a connection state,
wherein receiving, by the user equipment, the response message sent by the base station based on the cause value comprises:
receiving, by the user equipment, a first response message transmitted from the base station in response to determining that the cause value indicates that location area update occurs in the user equipment, wherein the first response message carries an instruction information which instructs the user equipment to continue working in the inactive state, or
in response to determining that the cause value indicates that location area update occurs in the user equipment and there is data to be transmitted, the method further comprises:
receiving, by the user equipment, a second response message transmitted from the base station in response to determining that a type of the data to be transmitted and a state of the current network meet a first condition, wherein the second response message carries the instruction information which instructs the user equipment to continue working in the inactive state, and carries a cause value indicating for rejecting to resume the connection state; and
receiving, by the user equipment, a third response message transmitted from the base station in response to determining that the type of the data to be transmitted and the state of the current network meet a second condition, wherein the third response message instructs the user equipment to resume the connection state,
wherein the type of the data to be transmitted and a state of the current network are determined by the base station.

2. The method according to claim 1, wherein determining the second message based on the judgment result and the first message, comprises:
determining that the cause value requesting for resuming connection comprises location area update and there being data to be transmitted, in response to determining that the judgment result indicates that there is data to be transmitted currently; and
acquiring the second message by including the cause value in the first message.

3. The method according to claim 2, wherein the second message further carries a type of the data to be transmitted, in response to determining that the judgment result indicates that there is data to be transmitted currently.

4. The method according to claim 3, wherein the type of the data to be transmitted comprises one of emergency service data, high-priority service data, user-equipment initiated signaling data, user-equipment initiated service data, network-triggered access signaling data, and delay-tolerant service data.

5. The method according to claim 2, wherein acquiring the second message by including the cause value in the first message, comprises one of:
acquiring the second message by adding one field in the first message, wherein the one field comprises both the location area update and there being data to be transmitted; and
acquiring the second message by adding two fields in the first message, wherein the two fields respectively indicates the location area update and there being data to be transmitted.

6. The method according to claim 1, wherein determining the second message which carries the cause value requesting for resuming connection based on the judgment result and the first message, comprises:
determining that the cause value requesting for resuming connection is location area update, in response to determining that the judgment result indicates that there is no data to be transmitted currently; and
acquiring the second message by including the cause value in the first message.

7. The method according to claim 6, wherein after transmitting the second message to the base station, the method comprises:
determining a third message based on the data to be transmitted, in response to determining that there is data to be transmitted before a response message returned by the base station based on the second message is received; and
transmitting the third message to the base station.

8. The method according to claim 1, wherein after transmitting the second message to the base station, the method comprises:
transmitting a fourth message to the base station, in response to determining that a cell in a new location area is re-selected before a response message returned by the base station based on the second message is received, wherein the fourth message is configured to instruct the user equipment to re-update the location area.

9. The method according to claim 1, wherein the method further comprises:
determining to trigger the RLAU, in response to determining that the user equipment re-selects a cell in a new location area.

10. The method according to claim 1, wherein the method further comprises:
determining whether to trigger the RLAU based on system conventions, in response to determining that the user equipment re-selects a cell in a new location area after a fifth message is transmitted to the base station and before a response message returned by the base station based on the fifth message is received, wherein the fifth message is configured to instruct that the cause value requesting for resuming connection of the user equipment is that there is data to be transmitted; and
executing an operation step for determining whether there is data to be transmitted currently, in response to determining that it is determined to trigger the RLAU and when the radio access network-based location area update (RLAU) is triggered, wherein the data to be transmitted is one of service data and signaling data.

11. The method according to claim 1, wherein the method further comprises:

receiving a response message returned by the base station based on the second message;

rejecting to transmit a resume completion message in response to determining that the response message instructs the user equipment to continue working in the inactive state, and instructing to a non-access stratum in a connection being not resumed and a cause value for the connection being not resumed when the judgment result is that there is data to be transmitted; and transmitting the resume completion message to the base station, and instructing to the non-access stratum that the connection is resumed, in response to determining that the response message instructs the user equipment to switch to a connection state.

12. A user equipment, comprising:
a processor; and
a memory for storing instructions executable by the processor, wherein
the processor is configured to implement the method for implementing location area update of claim 1.

13. The method according to claim 1, wherein the type of the data to be transmitted and the state of the current network have different weight coefficients.

14. A method for implementing a location area update, applied to a base station, the comprising:
receiving a second message transmitted by a user equipment in an inactive state, wherein the second message carries a cause value requesting for resuming connection; and
transmitting a response message to the user equipment based on the cause value, wherein the response message instructs the user equipment whether to switch to a connection state,
wherein transmitting the response message to the user equipment based on the cause value, comprises:
transmitting a first response message to the user equipment in response to determining that the cause value indicates that location area update occurs in the user equipment, wherein the first response message carries an instruction information which instructs the user equipment to continue working in the inactive state, or
determining a type of the data to be transmitted and state of the current network, in response to determining that the cause value indicates that location area update occurs in the user equipment and there is data to be transmitted; transmitting a second response message to the user equipment in response to determining that the type of the data to be transmitted and the state of the current network meet a first condition, wherein the second response message carries the instruction information which instructs the user equipment to continue working in the inactive state, and carries a cause value indicating for rejecting to resume the connection state; and transmitting a third response message to the user equipment in response to determining that the type of the data to be transmitted and the state of the current network meet a second condition, wherein the third response message instructs the user equipment to resume the connection state.

15. An apparatus for implementing a location area update, applied to a base station, the apparatus comprising:
a processor; and
a memory for storing instructions executable by the processor, wherein
the processor is configured to implement the method for implementing location area update of claim 14.

16. A base station, comprising:
a processor; and
a memory for storing instructions executable by the processor, wherein
the processor is configured to implement the method for implementing location area update of claim 14.

17. The method according to claim 14, wherein the type of the data to be transmitted and the state of the current network have different weight coefficients.

18. An apparatus for implementing a location area update, applied to a user equipment in an inactive state, the apparatus comprising:
a processor; and
a memory for storing instructions executable by the processor, wherein
the processor is configured to:
obtain a judgement result by determining whether there is data to be transmitted currently, when a radio access network-based location area update (RLAU) is triggered, wherein the data to be transmitted is one of service data and signaling data;
based on the judgment result and a first message, determine a second message, wherein the first message is an original connection resume request message, and the second message carries a cause value requesting for resuming connection;
transmit the second message to a base station; and
receive a response message sent by the base station based on the cause value, wherein the response message instructs the user equipment whether to switch to a connection state,
wherein the processor is further configured to:
receive a first response message transmitted from the base station in response to determining that the cause value indicates that location area update occurs in the user equipment, wherein the first response message carries an instruction information which instructs the user equipment to continue working in the inactive state, or
in response to determining that the cause value indicates that location area update occurs in the user equipment and there is data to be transmitted, the processor is further configured to:
receive a second response message transmitted from the base station in a response to determining that a type of the data to be transmitted and a state of the current network meet a first condition, wherein the second response message carries the instruction information which instructs the user equipment to continue working in the inactive state, and carries a cause value indicating for rejecting to resume the connection state; and
receive a third response message transmitted from the base station in response to determining that the type of the data to be transmitted and the state of the current network meet a second condition, wherein the third response message instructs the user equipment to resume the connection state,
wherein the type of the data to be transmitted and a state of the current network are determined by the base station.

19. The apparatus according to claim 18, wherein in order to determine the second message, which carries the cause value requesting for resuming connection, based on the judgment result and the first message, the processor is further configured to:
- determine that the cause value requesting for resuming connection comprises location area update and there being data to be transmitted, in response to determining that the judgment result indicates that there is data to be transmitted currently; and
- include the cause value in the first message to acquire the second message.

20. The apparatus according to claim 19, wherein the second message further carries a type of the data to be transmitted, in response to determining that the judgment result indicates that there is data to be transmitted currently.

* * * * *